US007551183B2

(12) United States Patent
Poddar

(10) Patent No.: US 7,551,183 B2
(45) Date of Patent: Jun. 23, 2009

(54) CLIPPING AND SCISSORING TECHNIQUE

(75) Inventor: Bimal Poddar, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 10/611,244

(22) Filed: Jun. 30, 2003

(65) Prior Publication Data

US 2004/0263534 A1 Dec. 30, 2004

(51) Int. Cl.
*G09G 5/00* (2006.01)
(52) U.S. Cl. .................. 345/620; 345/624; 345/625; 345/622
(58) Field of Classification Search ................ 345/619, 345/620, 621–629
See application file for complete search history.

(56) References Cited

U.S. PATENT DOCUMENTS

| 4,888,712 | A | * | 12/1989 | Barkans et al. ............. 345/627 |
| 5,585,863 | A | | 12/1996 | Hackett et al. |
| 5,847,712 | A | | 12/1998 | Salesin et al. |
| 5,986,669 | A | * | 11/1999 | Kirkland .................... 345/620 |
| 6,052,129 | A | * | 4/2000 | Fowler et al. ............... 345/620 |
| 6,169,554 | B1 | * | 1/2001 | Deering ...................... 345/764 |
| 6,333,744 | B1 | | 12/2001 | Kirk et al. |
| 6,359,630 | B1 | * | 3/2002 | Morse et al. ................ 345/620 |
| 6,469,704 | B1 | | 10/2002 | Johnson |
| 6,639,595 | B1 | | 10/2003 | Drebin et al. |
| 6,788,312 | B1 | | 9/2004 | Azar et al. |
| 2002/0130863 | A1 | | 9/2002 | Baldwin |
| 2002/0130886 | A1 | | 9/2002 | Baldwin |
| 2002/0167523 | A1 | | 11/2002 | Taylor et al. |
| 2003/0001852 | A1 | * | 1/2003 | Tuomi ........................ 345/531 |
| 2003/0067468 | A1 | * | 4/2003 | Duluk et al. ................ 345/506 |
| 2003/0164840 | A1 | | 9/2003 | O'Driscoll |

OTHER PUBLICATIONS

Woon-Sung Lee, et al., "A Driving Simulator As A Virtual Reality Tool", Department of Automotive Engineering, Kookmin University, Seoul, Korea, 6 pages.

Anthony Cataldo, "Intel's i740 Departs From The Norm To Improve 3-D Image Quality", May 27, 2003, EETimes, www.eetimes.com/news/98/993news/i740.html. May 27, 2003.

Intel Corporation, "Texture Maps 3D Primer", 6 pages, May 27, 2003, http://www.intel.com/technology/3D/docs/TEXTTURE.HTM.

http://www.techweb.com/encyclopedia/defineterm?term+graphicsaccelerator, "Graphics Accelerator", May 30, 2003, 2 pages.

(Continued)

*Primary Examiner*—Matthew C Bella
*Assistant Examiner*—Mike Rahmjoo
(74) *Attorney, Agent, or Firm*—Blakely, Sokoloff, Taylor & Zafman LLP

(57) ABSTRACT

A method is described that involves redefining a primitive surface to create a redefined primitive surface. The redefining involves clipping a first edge of the primitive surface to a second edge of a displayable screen area. The first edge of the primitive surface extends outside a guard band region prior to the clipping. The guard band region surrounds the displayable screen area. The clipping causes the redefined primitive surface to have an edge running within the guard band that the primitive surface does not have.

19 Claims, 5 Drawing Sheets

OTHER PUBLICATIONS http://oregonstate.edu/~whiteran/mid-report.htm, "Video Card Architecture", May 27, 2003, 4 pages.

Paul Zimmons, "A Study of Graphics Architectures", silicon Graphic's InfiniteReality, Evans & Sutherland's ESIG-4500, University of North Carolina's PixelFlow Graphics Supercomuter, Aug. 17, 1996, 41 pages.

NVIDIA, "Cube Map OpenGL Tutorial," pp. 1-15, printed on May 27, 2003, http://nvidia.com/view.asp?IO=IO__20010830__4778.

NVIDIA, "OpenGL Cube Map Texturing," pp. 18, 1999.

Addison-Wesley Publishing Company, Chapter 9 "Texture Mapping," pp. 41.

* cited by examiner

CLIPPING AND SCISSORING TECHNIQUE

FIELD OF INVENTION

The field of invention relates generally to graphics processing; and, more specifically, to an improved clipping and scissoring technique.

BACKGROUND

FIG. 1 shows an embodiment of a computing system. The exemplary computing system of FIG. 1 includes: 1) one or more processors 101; 2) a memory control hub (MCH) 102; 3) a system memory 103 (of which different types exist such as RDRAM, SDRAM, EDO RAM, etc,); 4) a cache 104; 5) an I/O control hub (ICH) 105; 6) a graphics controller 106; 7) a display 107 (of which different types exist such as a Cathode Ray Tube (CRT), TFT, LCD, etc.). The one or more processors 101 execute instructions in order to perform whatever software routines the computing system implements. The instructions frequently involve some sort of operation performed upon data. Both data and instructions are stored in system memory 103 and cache 104. Cache 104 is typically designed to have shorter latency times than system memory 103. For example, cache 104 might be integrated onto the same silicon chip(s) as the processor(s) and/or constructed with faster SRAM cells whilst system memory 103 might be constructed with slower DRAM cells.

By tending to store more frequently used instructions and data in the cache 104 as opposed to the system memory 103, the overall performance efficiency of the computing system improves. System memory 103 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 103 prior to their being operated upon by the one or more processor(s) 101 in the implementation of a software program.

Similarly, data that a software program determines should be sent from the computing system to an outside entity through one of the computing system interfaces, or stored into an internal storage element, is often temporarily queued in system memory 103 prior to its being transmitted or stored. The ICH 105 is responsible for ensuring that such data is properly passed between the system memory 103 and its appropriate corresponding computing system interface (and internal storage device if the computing system is so designed). The MCH 102 is responsible for managing the various contending requests for system memory 103 access amongst the processor(s) 101, interfaces and internal storage elements that may proximately arise in time with respect to one another.

Another computing system component that the MCH 102 may have to deal with (because it requests access to the system memory 103) is the graphics processor 106. The graphics processor 106 can be viewed as a co-processor that "takes on" the responsibility of performing sophisticated instructions associated with the presentation of complex visual images on the computing system's display 107. By removing such responsibility from processor(s) 101, the performance efficiency of the processor(s) is improved. The graphics processor 106 is designed to execute display image specific instructions so that display image specific software routines can be executed.

That is, the display image specific software routines are typically written in a language or format that can be broken down into instructions that the graphics processor can execute. Examples of such display image specific software languages/formats include OpenGL and D3D. In a typical case, a software driver beneath the main operating system (OS) (noting that the main OS is substantially executed on the processor(s) 101) is responsible for ensuring that instructions derived from software written in an display image specific software language/format (e.g., OpenGL or D3D) are forwarded to the graphics processor 106.

It should be noted that various other computing system architectures that include graphics processors yet depart from the particular architecture observed in FIG. 1 are possible. As such, the following discussion should not be considered as being automatically limited to the architecture of FIG. 1.

BRIEF DESCRIPTION OF THE FIGURES

The various embodiments of the present invention are illustrated by way of example, and not by way of limitation, in the figures of the accompanying drawings and in which.

DETAILED DESCRIPTION

Device Drivers for Graphics Processors

As the display image specific software that can be executed by a graphics processor may be complex in and of itself, the use of pre-prepared basic functional building blocks may reduce software development time. That is, by incorporating a pre-prepared basic software function (e.g., "rotate image with 3D perspective") into a comprehensive display image software routine—at least the development time of the basic software function itself is saved. If multiple basic functions are made available, the overall development time can be substantially reduced. A pre-prepared basic software function that can be re-used for different applications is often referred to as a device driver. A collection of such basic functions is often referred to as device drivers.

Figure 1:
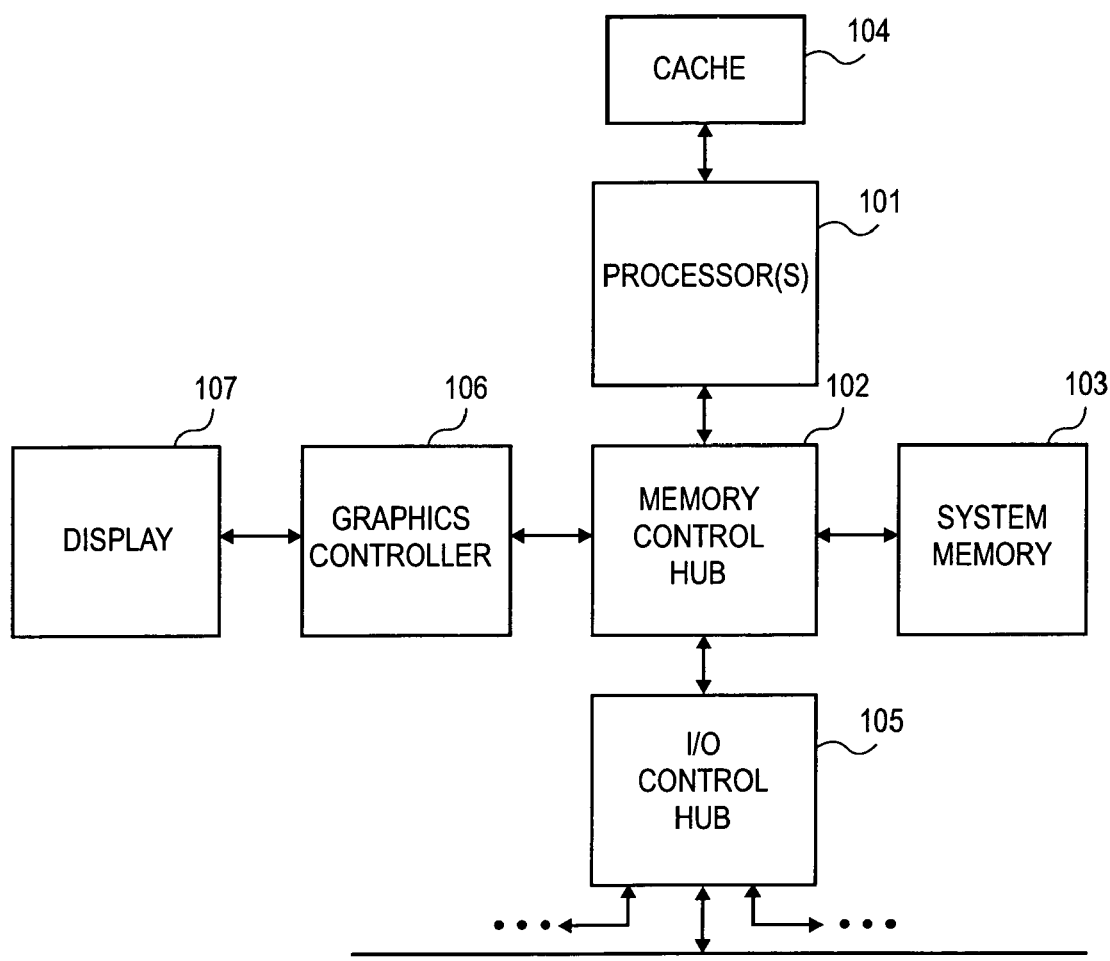
FIG. 1 shows a depiction of a computing system.
Figure 2:
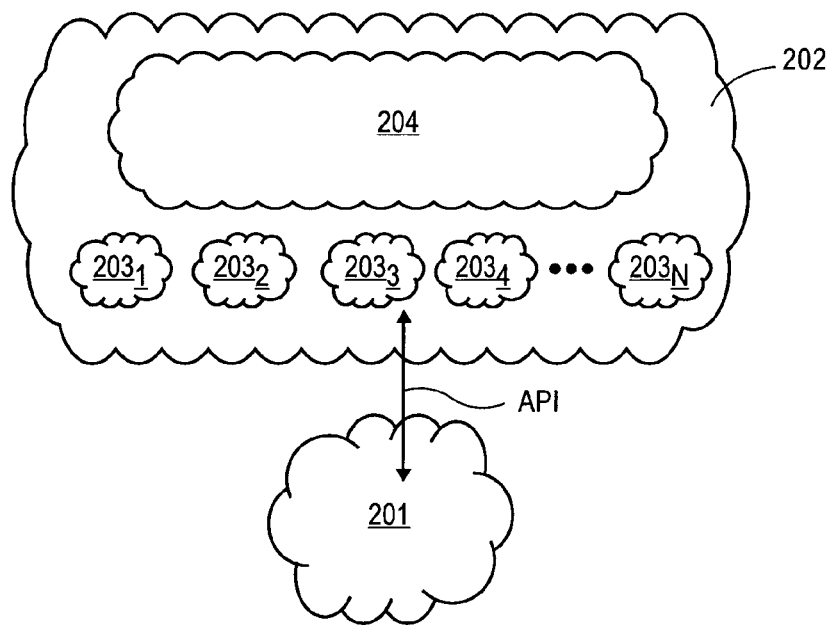
FIG. 2 shows a depiction of a graphics processor software.
Figure 2:
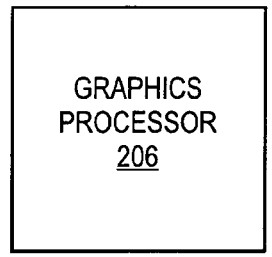

FIG. 2 attempts to depict the idea that device drivers may be incorporated into a more comprehensive display image software routine. According to FIG. 2, the aforementioned display image specific software language or format (e.g., OpenGL, D3D) can be viewed as a form of operating system 201 that "runs on" the graphics processor 206 and has it own associated Application Programmer's Interface (API) (e.g., an OpenGL API, a D3D API). The display image software that is directed to a particular application 202 (e.g., the imaging software for a particular video game) typically makes use of software 204 that is custom made for the particular application and device drivers $203_1$ through $203_N$. The device drivers $203_1$ through $203_N$, being a collection of basic functions, are drawn at a lower (i.e., more basic) level that the custom tailored software 204 and may also be viewed as a form of middle ware that exists between the custom tailored software 204 and the routines that the most basic language or format software 201 is comprised.

Graphics Processor Design

Graphics processor semiconductor chips may be designed, at least for images having a three dimensional perspective, to construct a body of information that is referred to in the art as a "surface". A surface is often understood to be a full description of only a piece of an overall image having a three dimensional perspective. As described in more detail below, a surface can be constructed by applying a number of features and/or tasks (e.g., scissoring, rasterizing, texturing, coloring) toward a "primitive" (e.g., a line, a triangle, a polygon, etc.). The basic idea is that a three dimensional drawing can be "rendered" as an ensemble of different surfaces (e.g., a number of different primitives each having its own characteristic set of features). The more surfaces that can be included in a drawing the more enriched or detailed the drawing will appear; and, the faster these surfaces can be generated the more fluid rendered motion will appear.

As alluded to just above, the processing involved in the construction of a surface can largely be viewed as the application or association of various procedures and/or computations to its underlying primitive. A pipeline, such as the exemplary pipeline presented in FIG. 3, can process multiple primitives or portions thereof simultaneously (by applying each pipeline stage to a different primitive or portion thereof in a single pipeline cycle). It should be noted that, with respect to graphics processor design, alternative pipeline architectures are possible; and, moreover, pipeline architectures are not an absolute necessity and/or may be implemented and/or enhanced with software. The following discussion of the pipeline of FIG. 3 is provided so that some of the basic procedures and/or computations that may be applied or associated to a primitive can be understood.

Figure 3:
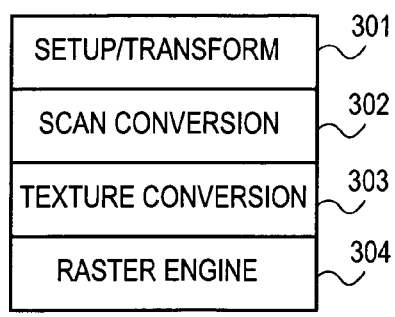
FIG. 3 shows a depiction of a graphics processor pipeline.

Accordingly, the Setup/Transform stage 301 of the pipeline of FIG. 3 is responsible for presenting a breakdown of a primitive to the Scan Conversion stage 302. Here, if a primitive is viewed as a "connect-the-dots" drawing, a separate "vertex" can be identified at each dot in the drawing and an "edge" can be identified for each line connecting dots in the drawing. In an embodiment, each vertex has associated data; and, the Setup/Transform stage 301 is responsible for fetching and processing this data in preparation for the Scan Conversion stage 302. Other processing tasks that may be performed by the Setup/Transform stage 301 include "scissoring".

Here, graphics computing often involves the comprehension of an overall image that is larger than what the screen can actually present. Likewise, the image processed by the software and graphics processor involves primitives that extend into a field or area that is outside the computing system screen's displayable area. Scissoring involves cutting away at those primitives that extend beyond the displayable screen area but remain within a "guardband" area that immediately surrounds the displayable screen area. More details concerning scissoring and a corresponding function performed in software (referred to as "clipping") are described in more detail below. The Scan Conversion stage 302 is responsible for defining, from the primitive's vertex and edge data, precise pixels that will be used to render the image of the primitive's corresponding surface on the computing system screen.

The Texture Conversion stage 303 applies appropriate "texture" (e.g., image, pattern or video) to the surface so that the surface will possess a called for look. For example, if the overall screen wide image to be rendered is that of torus (i.e., a three dimensional object having the shape of a doughnut) that is wallpapered with a newspaper page, "texture mapping" is used to effectively wallpaper the newspaper image/pattern to the torus. The resulting image would show the words of the newspaper page wrapping around the curves of the torus to give the image three dimensional perspective. Here, noting that the torus can be broken down into a plurality of smaller surfaces with each surface having its own corresponding primitive, the Texture Conversion stage 303 (through texture mapping) will effectively wallpaper each primitive with the appropriate region of the newspaper page (i.e., map certain newspaper words or portions thereof to the primitive of the appropriate surface).

The Raster Engine 304 calculates the appropriate color for each pixel in the corresponding surface. In a typical processing scheme, after a surface is constructed by the pipeline it is stored into a memory resource (e.g., system memory or a cache local to the graphics processor). The surfaces are then recalled and further processed when needed for actual on screen presentation.

Clipping and Scissoring

Figure 4A:
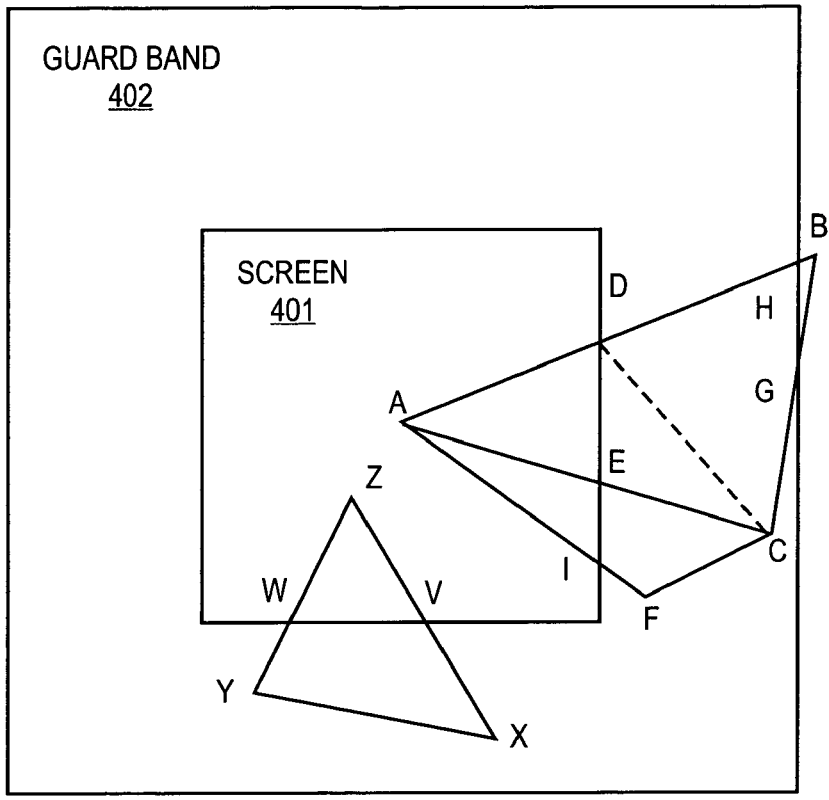
FIG. 4a shows a depiction of a displayable screen area, a guard band that surrounds the displayable screen area, and various primitives.

Recall from the discussion concerning FIG. 3 that graphics computing often involves the comprehension of an overall image that is larger than what the screen can actually present. As a consequence, the image processed by the software and graphics processor involves primitives that extend into a field or area that is outside the computing system screen's displayable area. FIG. 4a depicts an exemplary situation in further detail. FIG. 4a shows a representation of the displayable screen area 401. That is, matter directed to the confines of region 401 will be displayed on the computing system screen; while, matter directed outside the confines of region 401 will not be displayed on the computing screen. Nevertheless, at least to provide a proper three dimensional image, graphics processors and their corresponding software process matter that resides outside the displayable screen area 401.

Better said, because the processing involved with the display of a three dimensional image involves certain perspective calculations, calculations concerning matter outside the displayable screen area 401 are performed in order to render an image within the displayable screen area 401 having "correct" perspective. In order to covert the field of data that represents the wider overall image into a smaller field of data that represents just the matter within the displayable screen area 401, the wider overall image is "clipped" and "scissored" to the edges of the displayable screen area 401. That is, sort of like a cookie cutter that removes excess dough, clipping and scissoring removes the data that corresponds to excess imagery around the displayable screen area 401.

Figure 4B:
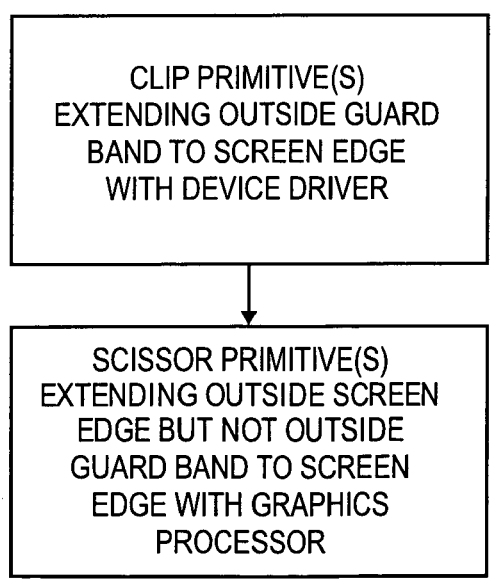
FIG. 4b shows a depiction of a prior art clipping and scissoring scheme.

Scissoring is a removal process that removes excess imagery surrounding the displayable screen area 401 and is typically performed in hardware with graphics processor circuitry that is devoted to the task. A guard band 402 represents the limits of the scissoring process (e.g., the physical limits of the scissoring circuitry's removal capabilities). Clipping is a removal process that removes matter outside the guard band and is typically performed with a software device driver. According to prior art approaches, a depiction of which is shown in FIG. 4b, primitives that extend outside the guard band 402 are clipped 403 in software; and, primitives that extend outside the displayable screen area 401 but not outside the guard band 402 are scissored 404 in hardware. The triangle primitives observed in FIG. 4a help illustrate the prior art approach. Here, the triangle ABC would be clipped in software because the vertex B of the triangle extends outside the guard band 402; and, the triangle XYZ would be scissored in hardware because the XYZ triangle extends outside the displayable screen area 401 but not outside the guard band 402.

The clipping of triangle ABC to the screen edge would result in triangle ADE (i.e., the portion encompassed by DECB would be removed from the description of the primitive); and, the scissoring of triangle XYZ would result in triangle WVZ (i.e., the portion encompassed by WVYX would be removed). A problem concerns primitives sharing a common edge where one primitive is to be clipped but the other primitive is to be scissored. An example is observed in FIG. 4*a* where triangle ABC (as discussed just above) would be clipped because triangle ABC extends outside the guardband; but, triangle ACF would be scissored because triangle ACF extends outside the displayable screen area 401 but does not extend beyond the guardband 402. Such a circumstance could cause defects (referred to as "pixel dropouts") in the displayed image of edge AE because edge AE would have a processing history that involves both a clipped primitive and a scissored primitive.

In order to prevent such defects, other prior art methods have clipped primitives that expand beyond the guard band 402 to the guard band 402. For example, triangle ABC would be clipped down to polygon ACGH in software. As a consequence, both triangle ACF and polygon ACGH would be scissored in hardware (because both extend beyond the displayable screen area 401 but not beyond the guard band 402). In turn, pixel dropout defects in the rendered image would be eliminated because edge AE would have a processing history that involves only scissored primitives. However, the processing involved in clipping and scissoring different portions of a same primitive (e.g., triangle ABC where region BHG is clipped but region BDEC is scissored) may be inefficient.

A potentially more efficient approach involves clipping at a finer level of detail than the prior art approaches described just above. That is, whereas the prior art approaches described just above are geared toward clipping entire surface area portions of a primitive, better efficiency might result if the clipping is geared toward removing primitive edges in and of themselves. Better said, clipping is performed by removing primitive matter on a "primitive edge"-by-"primitive edge" basis rather than on a "primitive region"-by-"primitive region" basis. Scissoring, by contrast, can be performed on a "primitive region"-by-"primitive region" basis if desired.

Figure 5:
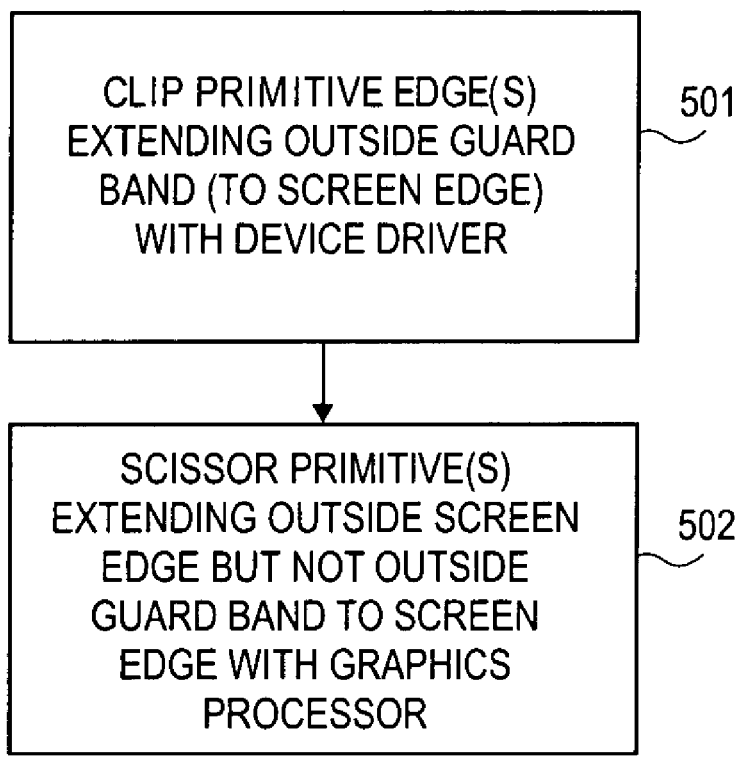
FIG. 5 shows a depiction of a novel clipping and scissoring scheme.

FIG. 5 shows an embodiment of a methodology. According to the methodology of FIG. 5, primitive edge(s) extending outside a guard band region 402 are clipped (e.g., with device driver software) 501; and, like the prior art, primitives that extend outside the displayable screen edge 401 but do not extend outside the guard band 402 are scissored (e.g., with a graphics processor) 502. Additionally, primitive edges that extend beyond both the displayable screen area 401 and the guard band 402 can be clipped directly to the displayable screen 401 edge. An example of such a primitive edge is observed with respect to edge AB of FIG. 4*a*. For example, as described in more detail below, edge AB can be clipped so as to remove edge region DB.

Considering the "rightmost" screen edge of the displayable screen 401 of FIG. 4*a* as the screen edge being clipped or scissored to, primitive edges BD and BC would be clipped because both edges extend outside the guard band 402. Note that the removal of edge BD corresponds to the clipping of the edge of primitive triangle ABC down to the rightmost displayable screen edge. The clipping of edge BC would cause re-definition of the primitive that was triangle ABC to triangle ADC. The dotted line connecting DC in FIG. 4*a* represents such re-definition. The re-definition may be further said to include: 1) removal of vertice B; 2) addition of new edge (DC); and, 3) addition of new vertice (D). After the clipping of edges BD and BC, the remainder primitive triangles ADC, ACF and XYZ are scissored down to the displayable screen 401 edge so as to leave triangles ADE, AEI and ZWV for display. Note that triangles ADE, ACF and XYZ extend beyond the displayable screen area 401 but do not extend beyond the guard band 402. As such they are well suited for scissoring.

Figure 6:
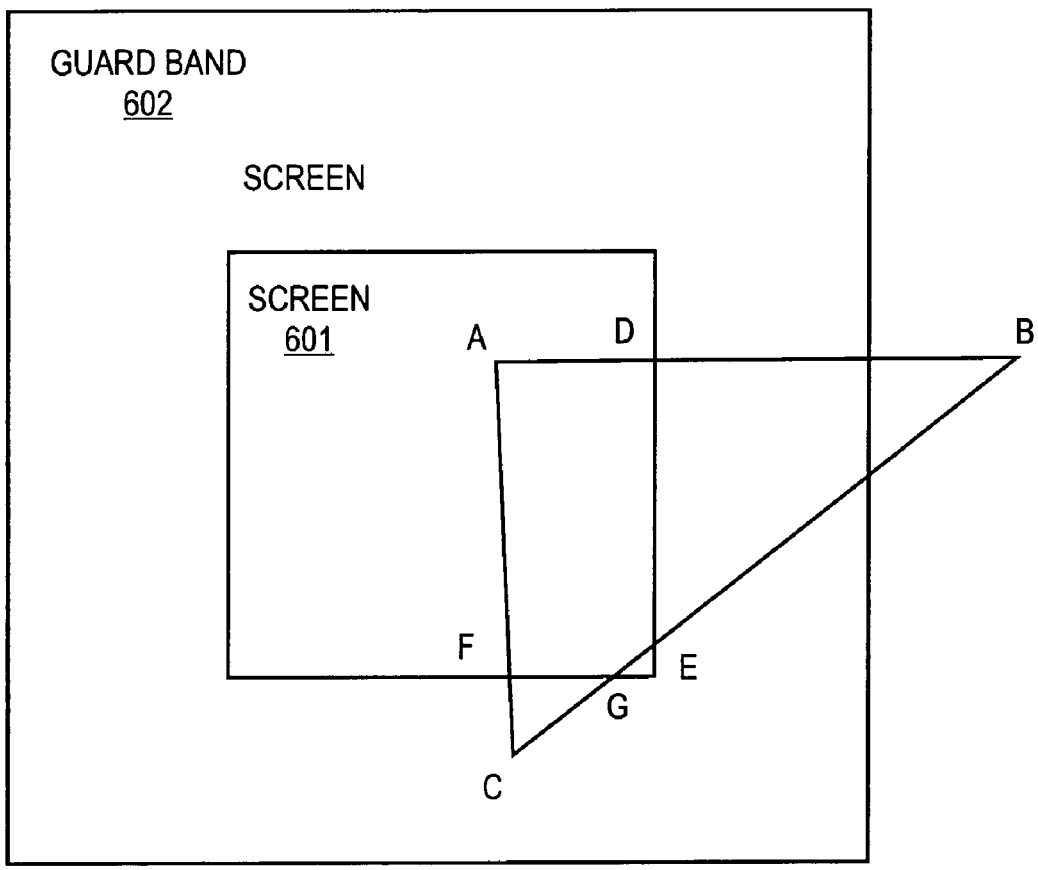
FIG. 6 shows another depiction of a displayable screen area, a guard band that surrounds the displayable screen area, and various primitives.

When clipping on a "primitive edge"-by-"primitive edge" basis, if a pair of edges that meet together at a vertex outside the guard band both cross the edge of the displayable screen edge being screened to, the resulting primitive may contain an extra vertex as compared to the primitive that existed prior to the clipping. FIG. 6 shows an example. Referring to FIG. 6, if the "rightmost" screen edge is the screen edge being clipped to, note that both of edges AB and BC: 1) meet together at vertex B outside the guard band 602; and, 2) cross the rightmost edge of the displayable screen area 601. Here, the original primitive that exists prior to clipping is the triangle ABC.

Yet, after clipping, primitive edge AB will be clipped to the rightmost screen 601 edge so as to leave primitive edge AD and create new primitive vertex D. Likewise, primitive edge BC will be clipped to the rightmost screen 601 edge so as to leave primitive edge CE and create new primitive vertex E. Note that the original (pre-clipping) primitive was a "three-vertex" triangle (ABC) whereas the reshaped (post-clipping) primitive is a "four-vertex" polygon. As such, the alterations made to the primitive as a consequence of the clipping cause the primitive to be reshaped into a primitive having an extra vertex as compared to the shape of the vertex that existed prior to the clipping. After clipping, the triangle CFG will be scissored in hardware by the graphics compiler.

Note that implementation of the present teachings may potentially result in efficiency improvements as compared to prior art methods. First, referring to FIG. 4*a*, note that a prior art clipping scheme would incur a computational cost for a pair of points H and G (e.g., specific locations or attributes associated with points H and G would be calculated); whereas, clipping on an edge by edge basis should incur a computational cost for a single point D. Moreover, clipping code overhead may be reduced. Clipping codes are used not only to identify specific locations relative to the displayable screen area but also relative to the guard band. By clipping to the screen edge, computations involving clip codes specifying position relative to the guard band may be eliminated.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claim is:

1. A computer-generated method for rendering an image on a display, comprising:

a processor redefining a primitive surface to create a redefined primitive surface, said redefining comprising clipping a first edge of said primitive surface to a second edge of a displayable screen area, said first edge of said primitive surface extending outside a guard band region prior to said clipping, said guard band region surrounding said displayable screen area, wherein said redefining further comprises clipping a third edge of said primitive surface to said second edge of said displayable screen area, said clipping of said third edge causing said redefined primitive surface to have a second vertex that said primitive surface does not have, said clipping causing said redefined primitive surface to have an edge running within said guard band that said primitive surface does not have; and, the processor scissoring said redefined primitive surface with graphics processing logic circuitry.

2. The method of claim 1 wherein, prior to said clipping, said primitive surface comprises a vertex outside said guard band region, said vertex connecting said first edge of said primitive surface and a third edge of said primitive surface, said third edge of said primitive surface extending outside said guard band region prior to said clipping.

3. The method of claim 2 wherein said redefined primitive surface comprises an edge that runs along said second edge of said displayable screen area.

4. The method of claim 1 wherein said method further comprises:

performing said redefining by executing machine executable instructions;

performing said scissoring with semiconductor chip logic circuitry.

5. The method of claim 4 wherein the machine executable instructions are derived from software code that is compatible with an OpenGL format.

6. The method of claim 4 wherein the machine executable instructions are derived from software code that is compatible with a D3D format.

7. The method of claim 4 wherein said semiconductor chip logic circuitry is embedded on a graphics processor circuit.

8. A tangible machine readable storage medium comprising instructions which when executed by a digital processing system cause said system to perform a method for rendering an image on a display, comprising:

preparing a primitive surface for scissoring by graphics processing logic circuitry by redefining said primitive surface to create a redefined primitive surface, said redefining comprising clipping a first edge of said primitive surface to a second edge of a displayable screen area, said first edge of said primitive surface extending outside a guard band region prior to said clipping and clipping a third edge of said primitive surface to said second edge of said displayable screen area, said clipping of said third edge causing said redefined primitive surface to have a second vertex that said primitive surface does not have, said guard band region surrounding said displayable screen area, said clipping causing said redefined primitive surface to have an edge running within said guard band that said primitive surface does not have.

9. The machine readable storage medium of claim 8 wherein, prior to said clipping, said primitive surface comprises a vertex outside said guard band region, said vertex connecting said first edge of said primitive surface and a third edge of said primitive surface, said third edge of said primitive surface extending outside said guard band region prior to said clipping.

10. The machine readable storage medium of claim 9 wherein said redefined primitive surface comprises an edge that runs along said second edge of said displayable screen area.

11. The machine readable storage medium of claim 8 wherein the machine executable instructions are derived from software code that is compatible with an OpenGL format.

12. The machine readable storage medium of claim 8 wherein the machine executable instructions are derived from software code that is compatible with a D3D format.

13. A computing system, comprising:

a) a flat panel display;
b) graphics processing logic circuitry coupled to said flat panel display;
c) a memory coupled to said graphics processing logic circuitry, said memory storing executable instructions which when executed by said graphics processing logic circuitry cause said graphics processor to perform a method, comprising:

preparing a primitive surface for scissoring by said graphics processing logic circuitry by redefining said primitive surface to create a redefined primitive surface, said redefining comprising clipping a first edge of said primitive surface to a second edge of a displayable screen area, said first edge of said primitive surface extending outside a guard band region prior to said clipping and clipping a third edge of said primitive surface to said second edge of said displayable screen area, said clipping of said third edge causing said redefined primitive surface to have a second vertex that said primitive surface does not have, said guard band region surrounding said displayable screen area, said clipping causing said redefined primitive surface to have an edge running within said guard band that said primitive surface does not have.

14. The computing system of claim 13 wherein, prior to said clipping, said primitive surface comprises a vertex outside said guard band region, said vertex connecting said first edge of said primitive surface and a third edge of said primitive surface, said third edge of said primitive surface extending outside said guard band region prior to said clipping.

15. The computing system of claim 14 wherein said redefined primitive surface comprises an edge that runs along said second edge of said displayable screen area.

16. The computing system of claim 13 wherein the machine executable instructions are derived from software code that is compatible with an OpenGL format.

17. The computing system of claim 13 wherein the machine executable instructions are derived from software code that is compatible with a D3D format.

18. The computing system of claim 13 wherein said flat panel display is an LCD display.

19. The computing system of claim 13 wherein said flat panel display is a TFT display.

* * * * *